United States Patent
Yamaguchi et al.

(10) Patent No.: US 7,647,786 B2
(45) Date of Patent: *Jan. 19, 2010

(54) AUTOMOTIVE AIR-CONDITIONING SYSTEM

(75) Inventors: Akira Yamaguchi, Chiryu (JP); Kenichi Kato, Nagoya (JP); Katsuhiko Samukawa, Okazaki (JP)

(73) Assignee: DENSO Corporation, Kariya (JP)

( * ) Notice: Subject to any disclaimer, the term of this patent is extended or adjusted under 35 U.S.C. 154(b) by 424 days.

This patent is subject to a terminal disclaimer.

(21) Appl. No.: 11/242,282

(22) Filed: Oct. 3, 2005

(65) Prior Publication Data

US 2006/0070387 A1 Apr. 6, 2006

(30) Foreign Application Priority Data

Oct. 4, 2004 (JP) ............................. 2004-291271

(51) Int. Cl.
*F25D 17/04* (2006.01)
*B60H 1/34* (2006.01)
(52) U.S. Cl. ..................... 62/186; 62/228.1; 62/244; 454/75; 454/256; 165/204
(58) Field of Classification Search ............... 62/186, 62/228.1, 229, 239, 244; 454/75, 156, 157, 454/158, 239, 256; 165/204
See application file for complete search history.

(56) References Cited

U.S. PATENT DOCUMENTS 5,340,021 A * 8/1994 Kajino et al. ............ 236/49.3
5,704,544 A * 1/1998 Samukawa et al. ....... 236/49.3
5,775,415 A * 7/1998 Yoshimi et al. ............ 165/202
6,170,274 B1 * 1/2001 Ichishi et al. .............. 62/179
6,719,624 B2 * 4/2004 Hayashi et al. ............ 454/120
2005/0235833 A1 * 10/2005 Sassa et al. ................. 96/417

FOREIGN PATENT DOCUMENTS

JP 08310230 11/1996
JP 2003-011638 1/2003

OTHER PUBLICATIONS

Office action dated Apr. 14, 2009 in corresponding Japanese Application No. 2004-291271.

* cited by examiner

*Primary Examiner*—Marc E Norman
(74) *Attorney, Agent, or Firm*—Harness, Dickey & Pierce, PLC (57) ABSTRACT

In an automotive air-conditioning system, when pollen mode control is effected by a vehicle occupant, air outlet mode is forcibly set to a face mode. Further, the air flow amount determined from the air flow amount Vm used in the usual auto mode and the air flow amount f(Tw) used during warm-up control or the air flow amount determined by the air flow amount correction value f(Tam) having a relatively small upper limit value when ambient temperature is higher than a predetermined temperature (15° C.), whichever is larger, is taken as the set value for the air flow amount in the pollen mode control. With this arrangement, when coolant temperature and ambient temperature are low, a relatively small amount of air can be blown to the upper part of the occupant's body, and thus, while maintaining the pollen removal effect, occupant discomfort can be reduced by preventing a fast flow of air from being blown toward the occupant's face, etc.

13 Claims, 8 Drawing Sheets

AUTOMOTIVE AIR-CONDITIONING SYSTEM

CROSS-REFERENCE TO RELATED APPLICATION

This application claims priority of Japanese Patent Application No. 2004-291271, filed on Oct. 4, 2004.

BACKGROUND OF THE INVENTION

1. Field of the Invention

The present invention relates to an automatic air-conditioning system which performs automatic control to provide a comfortable air-conditioned environment within the passenger compartment of a vehicle, and more particularly to an automotive air-conditioning system that can enhance occupant comfort by reducing the effects of pollen on the occupants.

2. Prior Art

In recent years, the demand for air-conditioned comfort has been growing, and along with this, the need to protect occupant health, especially, the need to remove pollen, has been increasing. As a system to meet such a need, an automotive air-conditioning system has been proposed that has a pollen removal filter which is installed only in an outside-air inlet duct so that outside air free from pollen is supplied into the passenger compartment (for example, refer to Japanese Unexamined Patent Publication No. H08-310230).

With the above prior art, however, it is not possible to remove pollen drawn in through a vehicle door when a passenger opens the door to get into the vehicle, nor is it possible to remove pollen adhering to the face, hair, or clothes of the occupant who has gotten into the vehicle. In view of this, the present applicant has proposed an invention for preventing such drawn-in pollen or occupant-borne pollen from floating near the face of the occupant, by effecting pollen mode control for reducing the effects of pollen on the occupant (Japanese Patent Application No. 2004-125447).

The pollen mode control is effected by setting the inside/outside air inlet to an inside-air introduction mode, the air outlet to a face mode, and the blower level to a medium level, and in this condition, pollen is collected by the filter installed in the air-conditioning unit and the air purified by removing the pollen is blown toward the face of the occupant in the passenger compartment.

However, since the above prior art pollen mode control is effected by setting the air outlet to the face mode, and the control is performed based on actuator control, which is different from the control performed based on thermal environment sensing as practiced in conventional automatic air-conditioning control, there has been the problem that the control may impair the thermal comfort for the occupants, depending on the thermal environment where the pollen mode control is performed.

SUMMARY OF THE INVENTION

In view of the above problem, it is an object of the present invention to achieve pollen mode control that can reduce degradation of thermal comfort while maintaining the pollen removal effect.

To achieve the above object, according to a first mode of the present invention, there is provided an automotive air-conditioning system comprising: blower control means (12b) for controlling the amount of air blown by a blower (12) mounted in an air passage (10a) within an air-conditioning unit (10); air outlet control means (17, 19, 21) for performing control to select at least one of a plurality of air outlets (16, 18, 20) installed at an end of the air passage and to direct the air blown by the blower so that the air is blown into a vehicle passenger compartment through the selected at least one air outlet; an ambient temperature sensor (32) for detecting temperature outside the passenger compartment; outlet air temperature control means for controlling the temperature of the air to be blown into the passenger compartment; pollen mode setting means (39f, 36) for switching between pollen mode control and normal control; and pollen mode control means (30) for performing, based on the switching by the pollen mode setting means, the pollen mode control in which the normal control is stopped and the air outlet control means is forcibly set to select a face air outlet (19) to blow the air toward an upper part of a vehicle occupant's body, wherein the pollen mode control means performs control in the pollen mode control by correcting at least either the amount of air used in the normal control or the outlet air temperature used in the normal control.

According to the above mode, when the pollen mode control is effected, since the air outlet is set to the face mode, and since at least either the amount of air or the outlet air temperature is set differently than in the normal control, air accounting for thermal comfort can be blown toward the upper part of the occupant's body; that is, while reducing the effects of pollen on the occupant, thermal discomfort can be reduced by preventing air which would cause discomfort from being blown toward the occupant.

According to a second mode of the present invention, the outlet air temperature control means includes a target outlet air temperature calculating means for calculating a target outlet air temperature for the air to be blown into the passenger compartment, and an outlet air temperature regulating means for regulating the temperature of the air based on the target outlet air temperature, wherein the pollen mode control means performs control in the pollen mode control by correcting at least either the amount of air or the target outlet air temperature used in the normal control. In this way, since at least either the amount of air or the target outlet air temperature used in the normal control is corrected in the pollen mode control, air accounting for thermal comfort can be blown toward the upper part of the occupant's body.

According to a third mode of the present invention, in the pollen mode control the pollen mode control means determines a set value for the amount of air based on the outside temperature detected by the ambient temperature sensor. In this way, the amount of air to be blown toward the upper part of the occupant's body can be set according to the outside temperature so as not to cause discomfort to the occupant.

According to a fourth mode of the present invention, the pollen mode control means determines, based on the thermal environment inside and outside the passenger compartment, whether a heating condition is satisfied or not, and sets the amount of air to different values depending on whether the heating condition is satisfied or not. In this way, the amount of air to be blown toward the upper part of the occupant's body during the heating mode can be set so as not to cause discomfort to the occupant.

According to a fifth mode of the present invention, when it is determined that the heating condition is satisfied, the pollen mode control means imposes an upper limit value on the set value of the amount of air. In this way, during the heating mode the amount of air to be blown toward the upper part of the occupant's body is prevented from being increased beyond the upper limit value, to reduce discomfort to the occupant.

According to a sixth mode of the present invention, the pollen mode control means changes the upper limit value according to the calculated target outlet air temperature. This serves to reduce discomfort during the heating mode.

According to a seventh mode of the present invention, when the result of the determination shows a non-heating condition, the pollen mode control means imposes a lower limit value on the set value of the amount of air. In this way, the effect of reducing the effects of pollen can be maintained while preventing the amount of air to be blown toward the upper part of the occupant's body during a non-heating mode from being reduced below the lower limit value.

According to an eighth mode of the present invention, when the target outlet air temperature is higher than a threshold, the pollen mode control means determines that the heating condition is satisfied.

According to a ninth mode of the present invention, the pollen mode control means corrects the target outlet air temperature calculated by the target outlet air temperature calculating means, and sets the corrected target outlet air temperature as the target value for the outlet air temperature in the pollen mode.

According to the above invention, since the target outlet air temperature in the normal control is corrected so as to provide the target value for the outlet air temperature in the pollen mode, the characteristic of the air to be blown toward the upper part of the occupant's body in the face mode can be set so as not to cause discomfort to the occupant.

According to a 10th mode of the present invention, an upper limit value is imposed on the corrected target outlet air temperature. This serves to reduce discomfort by preventing the air to be blown toward the upper part of the occupant's body from becoming excessively warm.

According to an 11th mode of the present invention, the pollen mode control means corrects the target outlet air temperature based on a set temperature set by the occupant. In this way, the air to be blown toward the upper part of the occupant's body can be set by reflecting the temperature setting made by the occupant.

According to a 12th mode of the present invention, the air-conditioning unit includes an air mix door control means (15a), and the air mix door control means determines the air mix door opening based on the target outlet air temperature corrected by the pollen mode control means. In this way, the air to be blown toward the upper part of the occupant's body can be controlled to the corrected target outlet air temperature.

According to a 13th mode of the present invention, the pollen mode setting means has a pollen mode switch and, when the pollen mode switch is operated, it is determined that the pollen mode control is set, or the pollen mode setting means has a pollen sensor and, when the amount of pollen detected by the pollen sensor exceeds a predetermined value, it is determined that the pollen mode control is set. In this way, when the pollen mode switch is operated by the occupant, or when the amount of pollen detected by the pollen sensor exceeds the predetermined value, the pollen mode control is automatically initiated.

Numerals in parentheses suffixed to the names of the above-described means correspond to the reference numerals of the specific means stated in the description of the embodiments given hereinafter.

The present invention may be more fully understood from the description of preferred embodiments of the invention, as set forth below, together with the accompanying drawings.

DETAILED DESCRIPTION OF THE PREFERRED EMBODIMENTS

Embodiment 1

Figure 1:
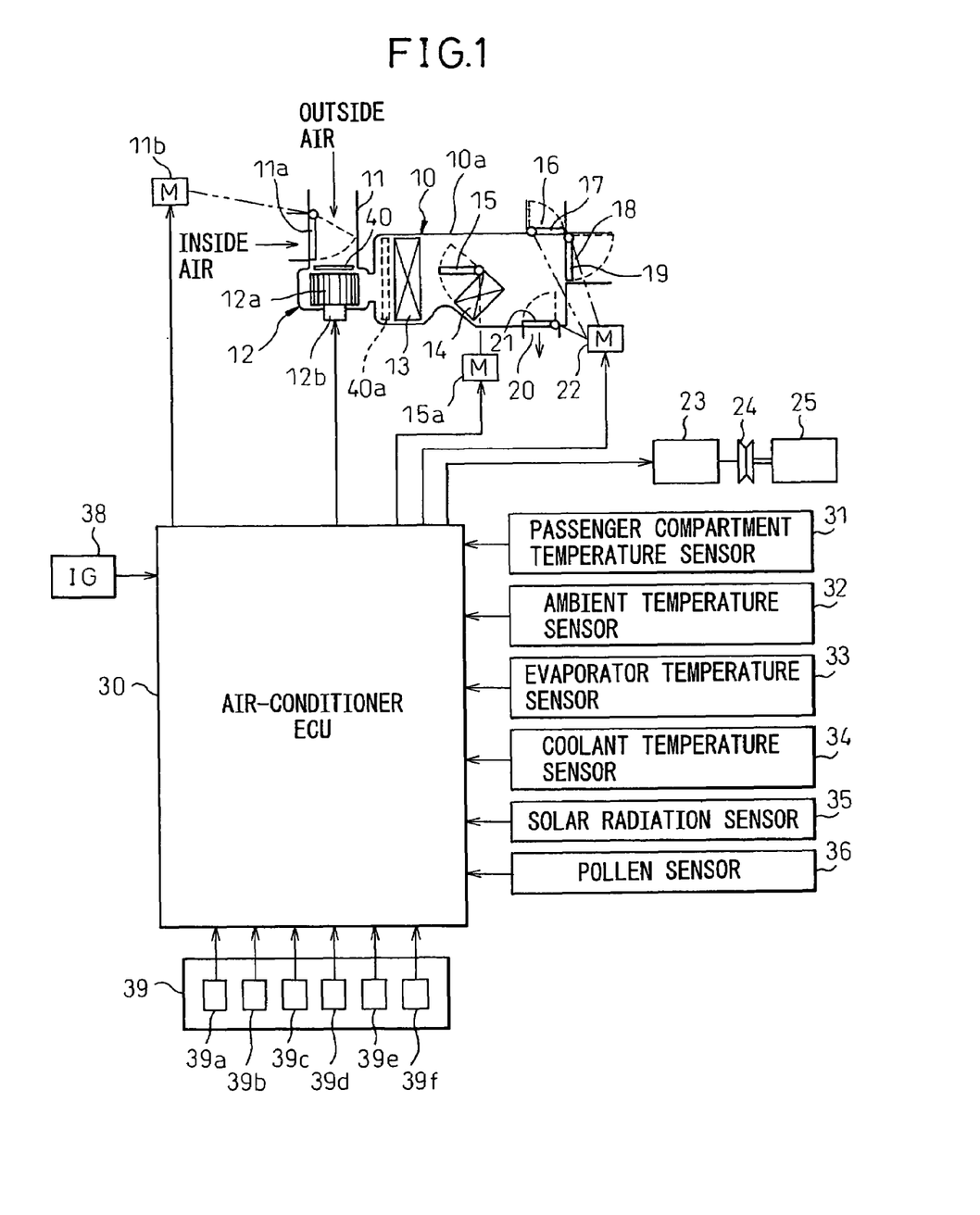
FIG. 1 is a general system diagram of an automotive air-conditioning system according to a first embodiment of the present invention.

A first embodiment of the present invention will be described below with reference to the drawings. FIG. 1 is a general system diagram of the first embodiment. In the automotive air-conditioning system of the first embodiment, an air-conditioning unit 10 mounted in the passenger compartment will be described first.

An inside/outside air selection box 11 is mounted at the airflow upstream end of the air-conditioning unit 10, and a plate-like inside/outside air selection door 11a is pivotably mounted inside the switching box 11. The inside/outside air selection door 11a is operated by an actuator 11b, a servo motor, to select between inside air (air inside the passenger compartment) and outside air (air outside the passenger compartment) for introduction into the air-conditioning unit 10.

A blower 12 is installed on the downstream side of the inside/outside air selection box 11. The blower 12 comprises a centrifugal blower fan 12a and a driving motor 12b, and blows the air, introduced via the inside/outside air selection box 11, into the passenger compartment through an air passage 10a formed inside the housing of the air-conditioning unit 10.

A filter 40 is installed directly adjacent to the upstream side of the blower 12. The outside air or inside air introduced via the inside/outside air selection box 11 is passed through the filter 40 which removes pollen and dust from the outside air or inside air.

The filter 40 contains a pollen allergen inactivating substance (for example, phenol-based high-molecular polymer) which inactivates allergens that cause hay fever. The pollen allergen inactivating substance combines with the active sites in the pollen allergens and inactivates the allergens. Therefore, if the pollen once collected by the filter should be separated from the filter and drawn into the passenger compartment, the pollen would not set off a hay fever attack in the vehicle occupant, because the pollen is already inactivated by the pollen allergen inactivating substance. In this way, the air passed through the filter 40 is introduced as purified air into the passenger compartment.

The filter 40 may be installed anywhere in the air passage 10*a* as long as it can filter all the air passing through the air passage 10*a*; for example, it may be installed directly adjacent to the downstream side of the blower 12 as indicated by a dashed line 40*a* in FIG. 1.

Inside the air passage 10*a* of the air-conditioning unit 10, an evaporator 13 is mounted directly adjacent to the downstream side of the blower 12, and a heater core 14 is disposed on the downstream side of the evaporator 13.

The evaporator 13 constitutes a cooling heat exchanger, which is provided within a known refrigeration cycle having a compressor 25 driven by a vehicle engine (not shown), and cools the air flowing over it as the low-pressure refrigerant flowing through the evaporator 13 absorbs heat from the air and vaporizes. The compressor 25 is equipped with a power engaging/disengaging electromagnetic clutch 24 driven by a driving unit 23, and the power of the vehicle engine is transmitted to the compressor 25 via the electromagnetic clutch 24.

The heater core 14 constitutes a heating heat exchanger, and heats the air flowing through it by taking heat from the hot water (coolant) circulating from the vehicle engine not shown.

An air mix door 15 constituting an outlet air temperature regulating means is pivotably mounted on the upstream side of the heater core 14. The opening of the air mix door 15 is adjusted by being driven by an actuator 15*a*, to adjust the proportion of the air passing through the heater core 14 to the air bypassing the heater core 14, thus regulating the temperature of the conditioned air to be blown into the passenger compartment.

At the downstream end of the air-conditioning unit 10 are installed a defroster door 17 for opening and closing a defroster air outlet 16 through which to blow the conditioned air toward the windshield W, a face door 19 for opening and closing a face air outlet 18 through which to blow the conditioned air toward the face and the upper part of the body of the occupant, and a foot door 21 for opening and closing a foot air outlet 20 through which to blow the conditioned air toward the feet of the occupant.

These doors 17, 19, and 21 constitute an air outlet control means, and are opened and closed in interlinking fashion by a common actuator 22 via a linking mechanism not shown. By controlling the opening/closing of these doors 17, 19, and 21, known outlet mode selections are accomplished.

Next, a description will be given of an electric control section according to the present embodiment. An air-conditioner control unit (air-conditioner ECU) 30 is a control means comprising a microcomputer and its peripheral circuitry, and starts operating upon the turning on of an ignition switch 38 for starting the vehicle engine. The air-conditioner control unit 30 controls the operation of the various actuators 11*b*, 15*a*, and 22, the blower driving motor 12*b*, and the driving unit 23 for driving the compressor 25, by performing operations based on a prescribed control program implemented on the microcomputer.

Signals from various sensors provided to detect environmental conditions that affect the air conditioning of the passenger compartment are input to the air-conditioner control unit 30. More specifically, signals are input to the air-conditioner control unit 30 from a passenger compartment temperature sensor 31 for detecting the temperature of the air (inside air temperature) Tr inside the passenger compartment, an outside air temperature sensor 32 for detecting the temperature of the air (ambient air) Tam outside the passenger compartment, an evaporator temperature sensor 33 for detecting the outlet air temperature Te of the evaporator 13, a coolant temperature sensor 34 for detecting the coolant temperature Tw in the heater core 14, a solar radiation sensor 35 for detecting the amount of solar radiation Ts entering the passenger compartment, and a pollen sensor 36 for detecting the amount of pollen (or pollen concentration) in the passenger compartment.

Here, the pollen sensor 36 is a small optical sensor of a known type; that is, the atmosphere containing pollen is actively introduced into a measuring chamber which is irradiated with laser light, and the amount of pollen inside the measuring chamber is measured by detecting the scattering light from spherical pollen particles in two axis directions.

An air-conditioner operation panel 39 is mounted near the instrument panel (not shown) in the passenger compartment, and comprises a plurality of operation members 39*a* to 39*f* manually operated by the occupant. Operation signals from these operation members 39*a* to 39*f* are input to the air-conditioner control unit 30. More specifically, the plurality of operation members include an AUTO switch 39*a* for effecting the automatic control mode of the air-conditioner, a temperature setting switch 39*b* for setting the temperature of the passenger compartment to the temperature that the occupant desires, an inside/outside air selector switch 39*c* for setting the outside-air introduction mode or inside-air recirculation mode, an air outlet mode selector switch 39*d* for setting the air outlet mode (face, bi-level, foot, foot DEF, and defroster), a blower level selector switch 39*e* for setting the blower level of the blower 12, and a pollen mode switch 39*f* for switching between normal control and pollen mode control described hereinafter.

Here, the pollen mode switch 39*f* may be implemented as a special pushbutton switch provided on the instrument panel or the like, or as a touch switch (not shown) included in an air-conditioner panel 39 that is displayed on a touch panel type navigation screen by switching from a navigation map, etc.

Next, the operation of the present embodiment having the above configuration will be described. FIG. 2 is a flowchart showing the main routine executed by the air-conditioner control unit 30. This control routine is started upon the turning on of the ignition switch 38, and is thereafter repeated at predetermined intervals of time.

First, in step S100, flag, timer, etc. are initialized, and in the next step S110, it is determined whether the occupant has operated the pollen mode switch 39*f* to effect the pollen mode control. More specifically, when the pollen mode switch 39*f* is operated, or when the amount of pollen detected by the pollen sensor 36 exceeds a predetermined value, for example, it is determined that the pollen mode control is effected, and the flag is set (flag=1).

In the next step S120, operation signals are read from the operation switches 39*a* to 39*f* on the air-conditioner operation panel 39, and vehicle environment detection signals are read from the various sensors 31 to 36.

Next, in step S130, the target outlet air temperature TAOB is calculated which is used in the normal air-conditioner control mode (called the auto mode or normal control) before switching to the pollen mode control. The target outlet air temperature TAOB defines the outlet air temperature necessary to maintain the passenger compartment at the set temperature Tset set by the temperature setting switch 39b in the normal control, and provides the basic target value for air-conditioner control. The target outlet air temperature TAOB is calculated from the following known equation (1) based on the set temperature Tset set by the temperature setting switch 39b on the air-conditioner operation panel 39, and on the passenger compartment temperature Tr, the ambient temperature Tam, and the amount of solar radiation Ts detected by the respective sensors as relating to the air-conditioning thermal loads.

$$TAOB = Kset \times Tset - Kr \times Tr - Kam \times Tam - Ks \times Ts + C \quad (1)$$

where Kset, Kr, Kam, and Ks are control gains, and C is a correction constant.

Next, in step S140, an air flow amount f1, which corresponds to the applied voltage (blower level) to the driving motor 12b of the blower 12, is calculated. A detailed calculation flow for the air flow amount f1 will be described with reference to the flowchart of FIG. 3.

Figure 4:
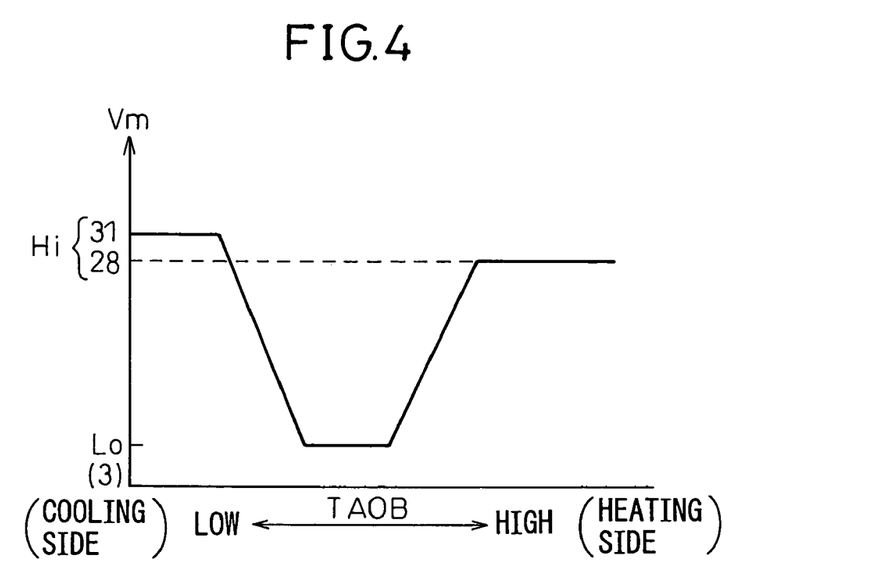
FIG. 4 is a diagram showing the characteristic of an air flow amount in normal control.

First, in step S200, the air flow amount Vm used in the normal control is calculated based on the target outlet air temperature TAOB, as shown in FIG. 4. That is, the amount of air to be blown into the passenger compartment can be determined so that the air flow amount becomes high in the low-temperature region (cooling side) and high-temperature region (heating side) of the target outlet air temperature TAOB, and becomes low in the intermediate-temperature region. In the present embodiment, the maximum air flow amount Hi that the blower 12 can deliver is set slightly higher on the cooling side than on the heating side.

Figure 3:
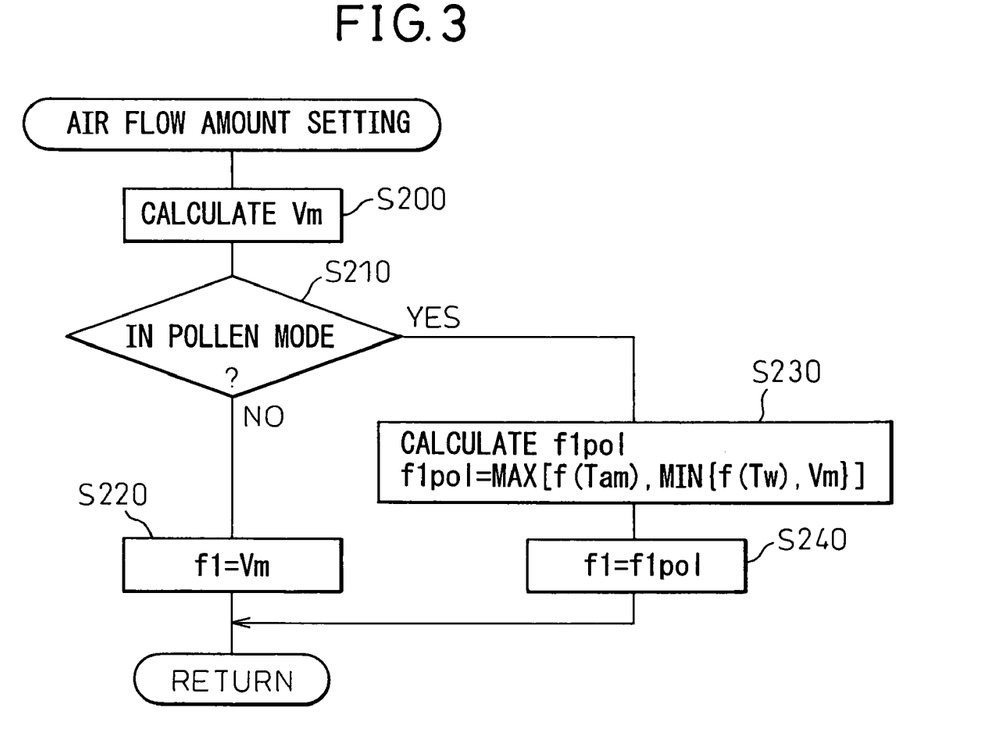
FIG. 3 is a flowchart showing a processing routine for air flow amount setting according to the first embodiment.

Next, in step S210, it is determined whether the air-conditioner is in the pollen mode control by examining the flag state. If it is not in the pollen mode control, then in step S220 the blower level that determines the air flow amount f1 is set to match the air flow amount Vm used in the normal control.

If the air-conditioner is in the pollen mode control, the process proceeds to step S230 where the pollen mode air flow amount f1pol is calculated from equation (2) below.

$$f1pol = MAX[f(Tam), MIN\{f(Tw), Vm\}] \quad (2)$$

Figure 5:
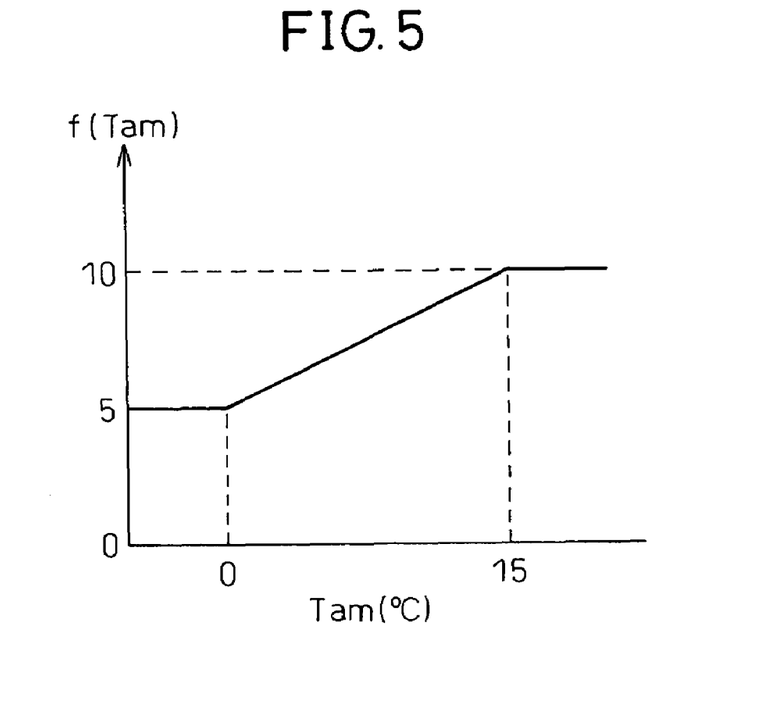
FIG. 5 is a diagram showing the characteristic of an air flow amount correction value f(Tam) according to ambient temperature.

Here, f(Tam) is the air flow amount determined according to the ambient temperature Tam, and is calculated as shown in FIG. 5. That is, for Tam $\leq 0°$ C., the air flow amount is set to a low level (for example, blower level=5), and for Tam $\geq 15°$ C., the air flow amount is set to a medium level (for example, blower level=10) as its upper limit value; in the region in between, the air flow amount is set so as to increase monotonically as a function of Tam.

Figure 6:
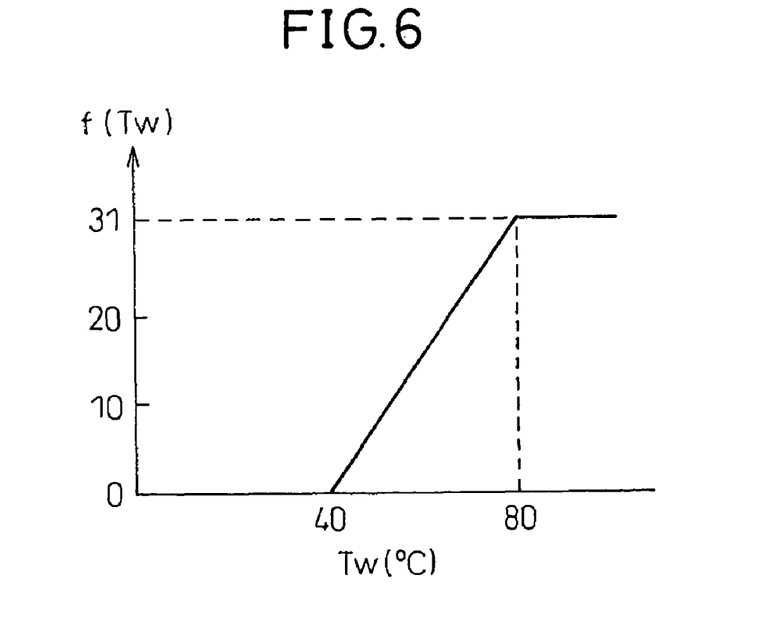
FIG. 6 is a diagram showing the characteristic of an air flow amount correction value f(Tw) according to cooling temperature.

On the other hand, f(Tw) is the air flow amount determined according to the coolant temperature Tw, and is calculated as shown in FIG. 6. The characteristic shown here is a well known one used during engine warm-up; that is, for Tw $\leq 40°$ C., the blower is stopped, and for Tw $\geq 80°$ C., the blower is set to deliver the maximum air flow amount Hi, while in the region in between, the air flow amount is set so as to increase monotonically as a function of Tw.

Accordingly, in the pollen mode control, when the ambient temperature Tam is relatively low, and the engine coolant temperature Tw is not sufficiently high, the contribution of the f(Tam) term to the air flow amount f1pol increases, and the air flow amount can be set to a medium level, not to 0.

Then, in step S240, the air flow amount f1pol in the pollen mode control is set to f1 which is the air flow amount corresponding to the blower level. The air flow amount setting in step S140 is thus completed.

Figure 2:
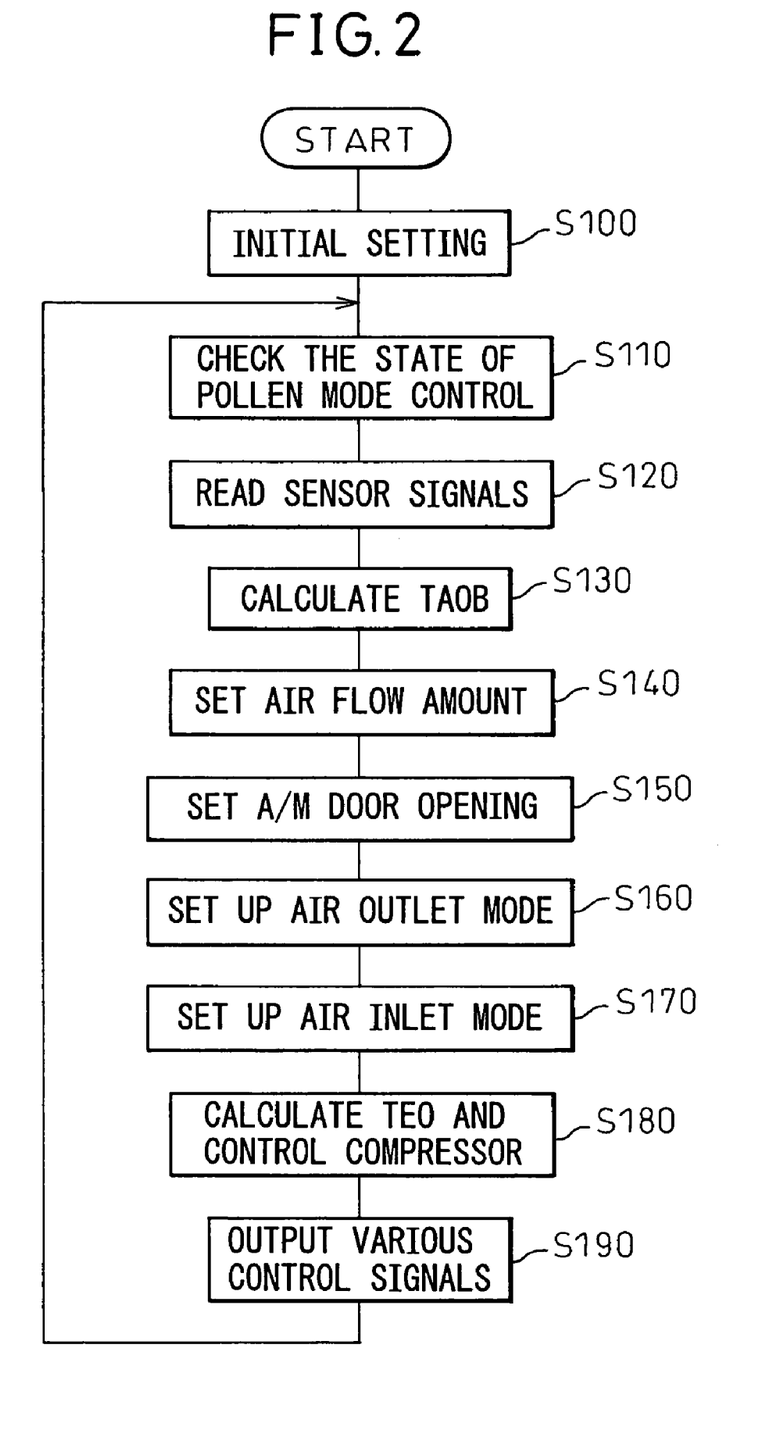
FIG. 2 is a flowchart showing a main routine executed by an air-conditioner control unit.

Next, in step S150 of the main routine, the target opening SW of the air mix door (A/M door) 15 is calculated. Basically, the target opening SW of the A/M door is calculated from the following equation (3) by using the outlet air temperature Te of the evaporator 13 (the temperature detected by the evaporator temperature sensor 33), the coolant temperature Tw in the heater core 14 (the temperature detected by the coolant temperature sensor 34), and the target outlet air temperature TAO.

$$SW = \{(TAO - Te)/(Tw - Te)\} \times 100(\%) \quad (3)$$

In the present embodiment, however, a value corrected based on the target outlet air temperature TAOB calculated for the normal control is used as the target outlet air temperature TAO in the pollen mode control. A specific procedure for the calculation will be described with reference to the flowchart of FIG. 7.

Figure 7:
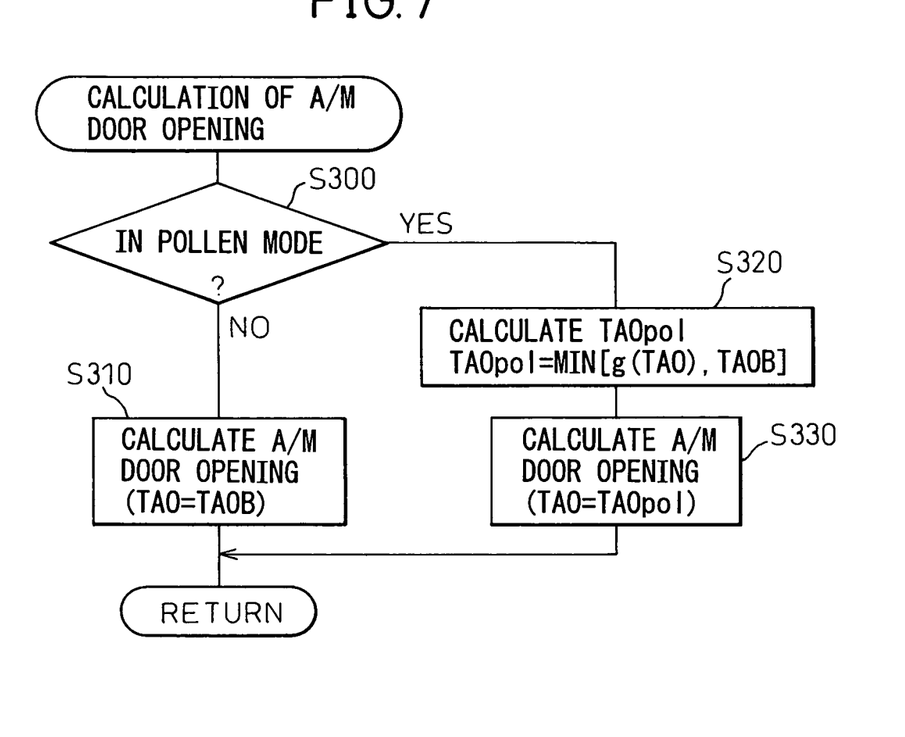
FIG. 7 is a flowchart showing a processing routine for the calculation of target A/M door opening according to the first embodiment.

First, in step S300, it is determined whether the air-conditioner is in the pollen mode control by examining the flag state. If the air-conditioner is not in the pollen mode control, that is, if it in the normal control, then in step S310 the target outlet air temperature TAO to be used in the equation (3) is set equal to the target outlet air temperature TAOB calculated in step S130 for the normal control.

If the air-conditioner is in the pollen mode control, the process proceeds to step S320 where the target outlet air temperature TAOpol in the pollen mode control is calculated from equation (4) below.

$$TAOpol = MIN\{g(TAO), TAOB\} \quad (4)$$

Figure 8:
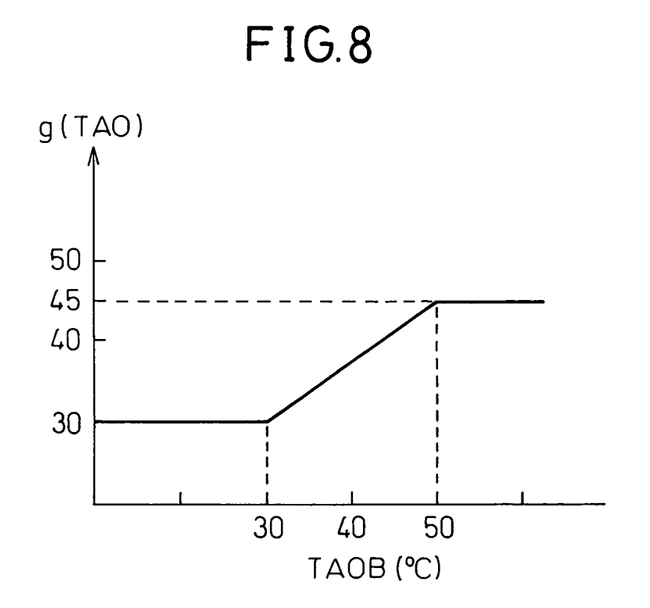
FIG. 8 is a diagram showing the characteristic of a correction value g(TAP) for target outlet air temperature.

Here, the correction value g(TAO) is calculated to provide the characteristic shown in FIG. 8 as a function of the target outlet air temperature TAOB used in the normal control. That is, when TAOB is low (TAOB$\leq 30$), the correction value g is held at a given lower limit value, and when TAOB is high (TAOB$\geq 50$), the value g is held at a given upper limit value, while in the temperature region in between, the value g is set so as to increase monotonically as a function of TAOB.

Accordingly, from the equation (4), in the low-temperature region, the target outlet air temperature TAOpol in the pollen mode control is set equal to the target outlet air temperature TAOB used in the normal control, while in the intermediate- and high-temperature regions, TAOpol is given as a value that is held at the upper limit value in the high-temperature region shown in FIG. 8.

Based on the thus calculated target outlet air temperature TAOpol for the pollen mode control, the target A/M door opening SW is calculated from the previously given equation (3). In this way, in the intermediate-temperature region, the outlet air temperature can be set lower than in the normal control, and in the high-temperature region, the outlet air temperature can be limited (fixed) to the upper limit value. Accordingly, in the pollen mode control, even if the target outlet air temperature TAOpol increases, the temperature of the air blown to the upper part of the occupant's body from the air outlet, that is, from the face air outlet 18, as will be described later, does not increase, and this serves to reduce occupant discomfort.

The calculation and setting of the target A/M door opening SW in step S150 is thus completed.

Next, in step S160, the air outlet mode (air outlet damper position) is set up. More specifically, when it is determined based on the flag that the air-conditioner is in the pollen mode control, the face mode is selected and the conditioned air is blown from the face air outlet 18 toward the upper part of the occupant's body. On the other hand, when in the normal control, well-known air outlet mode control is performed;

that is, when the target outlet air temperature TAOB is low, the face mode is selected, and when TAOB is high, the foot mode for blowing the conditioned air from the foot air outlet 20 is selected, while in the temperature region in between, the bi-level (B/L) mode for blowing the conditioned air from both the face air outlet and the foot air outlet 20 is selected.

In the next step S170, the air inlet mode is set up, that is, the opening of the inside/outside air selection door 11a in the inside/outside air selection box 11 is calculated based on the target outlet air temperature TAOB. As is well known, the air inlet mode is set up so that the opening of the inside/outside air selection door 11a changes from the inside-air mode side when the target outlet air temperature TAOB is low to the outside-air mode side when TAOB is high.

In the next step S180, the target evaporator outlet air temperature TEO is calculated in a well known manner, that is, in such a manner that it increases with increasing ambient temperature Tam and increasing target outlet air temperature TAOB, and the compressor is controlled based on the target evaporator outlet air temperature TEO. More specifically, an ON-OFF signal is supplied to the driving circuit 23 so as to engage or disengage the electromagnetic clutch 24, based on whether the outlet air temperature Te of the evaporator 13 is lower than or higher than the thus calculated target evaporator outlet air temperature TEO.

Here, the processing in steps S170 and S180 is carried out regardless of whether the control is the normal control or the pollen mode control. Alternatively, in the pollen mode control, the air inlet mode in step S170 may be set to 100% inside-air mode. In that case, pollen can be preventing from entering the passenger compartment from outside the vehicle, and the pollen removal effect can thus be enhanced.

Then, in step S190, control signals are output to control the operation of the respective target devices.

As described above, according to the first embodiment, when the pollen mode switch 39f as a pollen mode setting means is operated by the occupant, or when the amount of pollen detected by the pollen sensor 36 exceeds a predetermined value, the pollen mode control is initiated.

In the pollen mode control, the air flow amount (blower level) f1 of the blower 12 is set so that it is held at a given lower limit value when the ambient temperature Tam is low and at a given upper limit value when Tam is high, based on the equation (2) by using the air flow amount correction value f(Tam) which is set as a function of the ambient temperature Tam. In this way, when the coolant temperature Tw and the ambient temperature Tam are both relatively low, the blower level in the pollen mode control is set to a medium level higher than the blower level that would be set to 0 or a low level in the normal control; in this way, by blowing a medium amount of conditioned air toward the upper part of the occupant's body in the face mode, occupant discomfort can be reduced while maintaining the pollen removal effect.

Further, in the pollen mode control, the target outlet air temperature TAOpol based on which to determine the target A/M door opening SW is corrected so that as the target outlet air temperature TAOB in the normal control increases, the target outlet air temperature TAOpol increases monotonically from the given lower limit value toward the given upper limit value but is always kept lower than the target outlet air temperature TAOB used in the normal control. Accordingly, in the pollen mode control, when the target outlet air temperature TAOB is high, the A/M door opening can be set smaller than in the normal control, that is, the outlet air temperature can be set lower to reduce occupant discomfort by not blowing high-temperature air to the upper part of the occupant's body.

The first embodiment has shown an example in which the air flow amount (step S230) and the A/M door opening (step S320) are set differently in the pollen mode control than in the normal control, but alternatively, only one of them may be set differently.

Embodiment 2

Next, a second embodiment of the present invention will be described. The second embodiment is the same as the first embodiment in that the air flow amount is set differently in the pollen mode control than in the normal control, but differs from the first embodiment only in that the air flow amount is set to different values, depending on whether the heating condition is satisfied or not. In the following, the description of the same constituent parts as those in the first embodiment will not be repeated, but only differences will be described.

Figure 9:
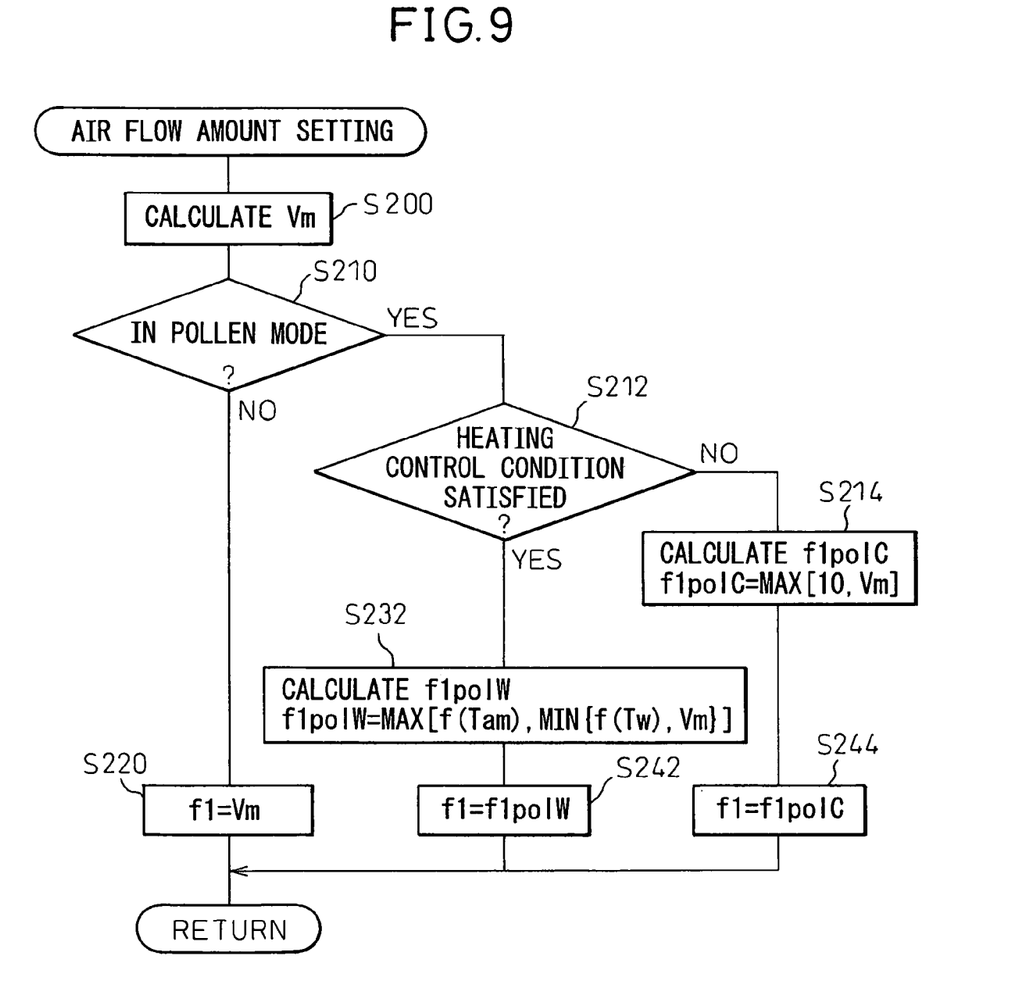
FIG. 9 is a flowchart showing a processing routine for air flow amount setting according to a second embodiment.

FIG. 9 is a flowchart showing a processing routine for setting the air flow amount according to the second embodiment. As in the first embodiment, the air flow amount setting is executed in step S140 in the main routine of FIG. 2. In FIG. 9, the same processing steps as those in the first embodiment (FIG. 3) are designated by the same step numbers, and the description thereof will not be repeated here.

If it is determined in step S210 that the air-conditioner is in the pollen mode control, the process proceeds to step S212 to determine whether the heating control condition is satisfied or not. More specifically, when the target outlet air temperature TAOB is higher than a threshold, it is determined that the heating control condition is satisfied.

If it is determined that the heating control condition is satisfied, the process proceeds to step S232 where the heating air flow amount f1 polW is calculated based on the characteristic diagrams of FIGS. 4 to 6 in the same manner as shown in the right-hand side of the equation (2), and in step S242, the heating air flow amount f1polW thus calculated is set as the final air flow amount f1 in the pollen mode control.

On the other hand, if it is determined in step S212 that the heating control condition is not satisfied, the process proceeds to step S214 where the cooling air flow amount f1polC is calculated from the following equation (5) based on the characteristic diagram of the air flow amount Vm shown in FIG. 4, and in step S244, the cooling air flow amount f1polC thus calculated is set as the final air flow amount f1 in the pollen mode control.

$$f1polC=\text{MAX}(10, Vm) \quad (5)$$

From this equation (5), the cooling air flow amount f1polC is set so that the minimum value of the air flow amount in the cooling side does not become smaller than the lower limit value (=10). That is, in the cooling mode, when the air flow amount is calculated as Vm=20 based on the target outlet air temperature TAOB, the air flow amount f1polC is set so as to maintain this Vm value. Further, even when TAOB increases in the cooling side, and Vm becomes the minimum level (Lo<10), the air flow amount f1polC is set so as to maintain the lower limit value (=10).

As described above, in the second embodiment, when the coolant temperature Tw and the ambient temperature Tam are both relatively low, a medium amount of conditioned air can be blown toward the upper part of the occupant's body in the face mode, and occupant discomfort can thus be reduced while maintaining the pollen removal effect.

Further, in the second embodiment, when the heating condition is not satisfied, since the air flow amount is set so that the minimum value of the air flow setting does not become smaller than the lower limit value, a relatively large amount of conditioned air of a relatively low temperature can be blown toward the upper part of the occupant's body in the face mode, and occupant discomfort can thus be reduced while maintaining the pollen removal effect.

Embodiment 3

Next, a third embodiment of the present invention will be described. The third embodiment is essentially the same as the second embodiment, but differs only in that the air flow amount f1polW under the heating control condition is set differently. The following description deals only with the difference.

Figure 10:
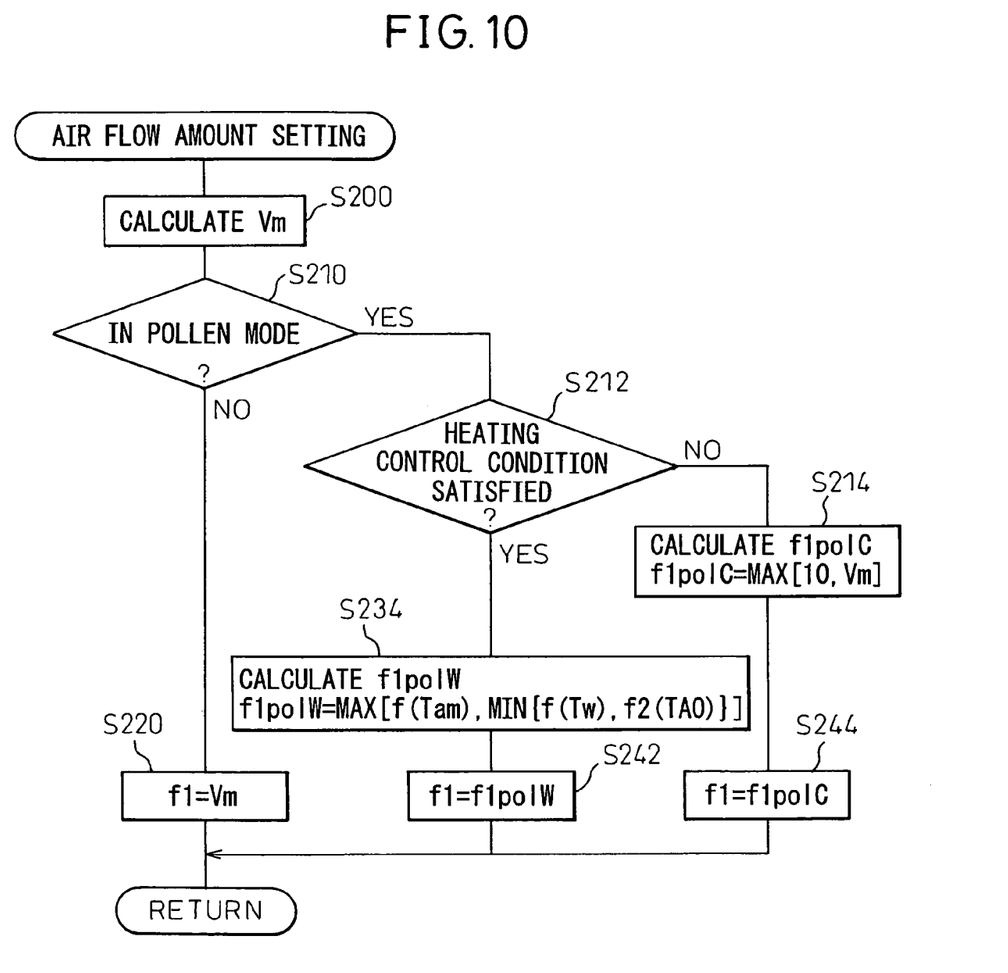
FIG. 10 is a flowchart showing a processing routine for air flow amount setting according to a third embodiment.

FIG. 10 is a flowchart showing a processing routine for setting the air flow amount according to the third embodiment. In FIG. 10, the difference from the second embodiment lies in the equation used to calculate the air flow amount set value f1polW in step S234.

That is, the air flow amount set value f1polW under the heating control condition, when in the pollen mode control, is calculated from the following equation (6).

$$f1polW=MAX[f(Tam), MIN\{f(Tw), f2(TAO)\}] \quad (6)$$

Figure 11:
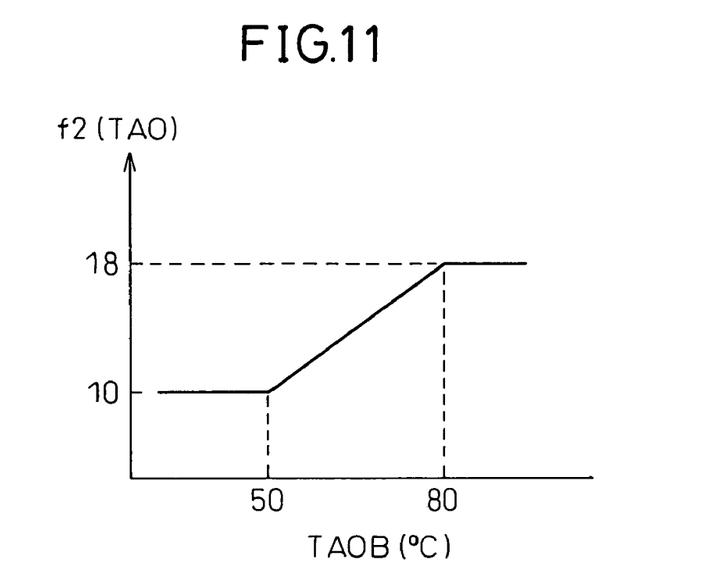
FIG. 11 is a diagram showing the characteristic of an air flow amount correction value f2(TAO) according to the third embodiment.

Here, f2(TAO) is the air flow amount determined according to the target outlet air temperature TAOB, and is calculated as shown in FIG. 11. That is, based on the target outlet air temperature TAOB calculated in step S130 of the main routine (FIG. 2), the air flow amount is set to the lower limit value (=10) when TAOB is low and to the upper limit value when TAOB is high, and in the region in between, the air flow amount is set so as to increase monotonically with TAOB. The characteristic diagram of FIG. 11 particularly differs from the characteristic diagram of the air flow amount Vm shown in FIG. 4 in the first and second embodiments in that, on the low-temperature side, the value is fixed to the given lower limit value, and in that, on the high-temperature side, the upper limit value for the air flow amount set value is set relatively low.

Accordingly, in the third embodiment, in the region where the target outlet air temperature TAOB is relatively high under the heating condition, the air flow amount f1polW can be set to a relatively low value (f2(TAO)=10 to 18). That is, when the air-conditioner is in the pollen mode control and is operating in the heating mode, the amount of air blown toward the upper part of the occupant's body in the face mode is not excessive (not set to the maximum air flow amount Hi), but is set to a moderate level just sufficient to provide the pollen removal effect, and this serves to reduce occupant discomfort.

Embodiment 4

Next, a fourth embodiment of the present invention will be described. The fourth embodiment is the same as the first embodiment in that the target A/M door opening is set differently in the pollen mode control than in the normal control, but differs from the first embodiment only in that the target outlet air temperature TAOpol used in the calculation of the target A/M door opening is determined so as to reflect the temperature setting made by the occupant. In the following, the description of the same constituent parts as those in the first embodiment will not be repeated, but only differences will be described.

Figure 12:
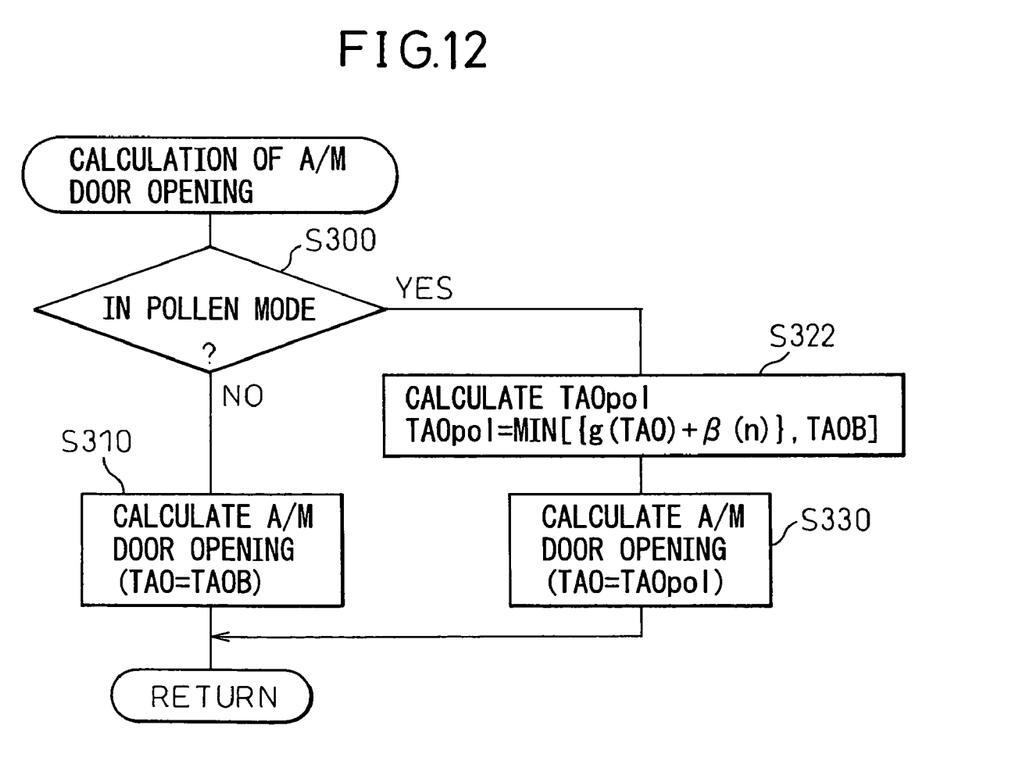
FIG. 12 is a flowchart showing a processing routine for the calculation of target A/M door opening according to a fourth embodiment.

FIG. 12 is a flowchart showing a processing routine for setting the target A/M door opening according to the fourth embodiment. As in the first embodiment, this routine is executed in step S150 in the main routine of FIG. 2. In FIG. 12, the same processing steps as those in the first embodiment (FIG. 7) are designated by the same step numbers, and the description thereof will not be repeated here.

If it is determined in step S300 that the air-conditioner is in the pollen mode control, the process proceeds to step S322 where the target outlet air temperature TAOpol in the pollen mode control is calculated from the following equation (7).

$$TAOpol=MIN[\{g(TAO)+\beta(n)\}, TAOB] \quad (7)$$

Here, for the correction value g(TAO) and the target outlet air temperature TAOB, the same values as those used in the equation (4) in the first embodiment are used.

Further, β(n) is expressed by the following equation (8) using the occupant-set temperature set value Tset(n), a constant Kp, and the number of calculations, n. Here, β(0)=0.

$$\beta(n)=\beta(n-1)+Kp(Tset(n)-Tset(n-1)) \quad (8)$$

Specifically, in the fourth embodiment, when the set temperature Tset is changed by the occupant by operating the temperature setting switch 39b, the correction value g(TAO) in the pollen mode control is changed by an amount corresponding to the amount of change. This is equivalent to shifting the line graph in the characteristic diagram of g(TAO) in FIG. 8 in the directions of the vertical and horizontal axes by an amount corresponding to the amount of change.

With the above arrangement, the target A/M door opening characteristic in the pollen mode control can be prevented from changing when the set temperature Test is changed by the occupant.

Other Embodiments

The above embodiments have shown various examples of how, in the pollen mode control in which the air outlet mode is set to the face mode, the air flow amount set value and the target A/M door opening are set differently than those in the normal control (auto mode), but it will be appreciated that the combination of the air flow amount set value and the target A/M door opening can be changed in various ways.

Further, in the pollen mode control, only the air flow amount set value may be set differently than in the normal control and, for the target A/M door opening, the same value as used in the normal control may be used. Conversely, only the target A/M door opening may be set differently, while for the air flow amount set value, the same value as used in the normal control may be used.

What is claimed is:

1. An automotive air-conditioning system comprising:

blower control means (12b) for controlling the amount of air blown by a blower (12) mounted in an air passage (10a) within an air-conditioning unit (10);

air outlet control means (17, 19, 21) for performing control to select at least one of a plurality of air outlets (16, 18, 20) installed at an end of said air passage and to direct the air blown by said blower so that the air is blown into a vehicle passenger compartment through said selected at least one air outlet;

ambient temperature sensor (32) for detecting temperature outside said passenger compartment;

outlet air temperature control means for controlling the temperature of the air to be blown into said passenger compartment;

pollen mode setting means (39f, 36) for switching between pollen mode control and normal control; and pollen mode control means (30) for performing, based on said switching by said pollen mode setting means, said pollen mode control in which said normal control is stopped and said air outlet control means is forcibly set to select a face air outlet (19) to blow the air toward an upper part of a vehicle occupant's body, wherein said pollen mode control means performs control in said pollen mode control by correcting at least either said amount of air used in said normal control or said outlet air temperature used in said normal control.

2. An automotive air-conditioning system as claimed in claim 1, wherein said outlet air temperature control means includes a target outlet air temperature calculating means (S13) for calculating a target outlet air temperature for the air to be blown into said passenger compartment, and an outlet air temperature regulating means (15) for regulating the temperature of said air based on said target outlet air temperature, and said pollen mode control means performs control in said pollen mode control by correcting at least either said amount of air or said target outlet air temperature used in said normal control.

3. An automotive air-conditioning system as claimed in claim 2, wherein said pollen mode control means determines, based on a thermal environment inside and outside said passenger compartment, whether a heating condition is satisfied or not, and sets said amount of air to different values depending on whether said heating condition is satisfied or not.

4. An automotive air-conditioning system as claimed in claim 3, wherein when it is determined that said heating condition is satisfied, said pollen mode control means imposes an upper limit value on the set value of said amount of air.

5. An automotive air-conditioning system as claimed in claim 4, wherein said pollen mode control means changes said upper limit value according to said calculated target outlet air temperature.

6. An automotive air-conditioning system as claimed in claim 3, wherein when the result of said determination shows a non-heating condition, said pollen mode control means imposes a lower limit value on the set value of said amount of air.

7. An automotive air-conditioning system as claimed in claim 3, wherein when said target outlet air temperature is higher than a threshold, said pollen mode control means determines that said heating condition is satisfied.

8. An automotive air-conditioning system as claimed in claim 2, wherein said pollen mode control means corrects the target temperature calculated by said target outlet air temperature calculating means, and sets said corrected target temperature as the target value for the outlet air temperature in said pollen mode.

9. An automotive air-conditioning system as claimed in claim 8, wherein said pollen mode control means imposes an upper limit value on said corrected target outlet air temperature.

10. An automotive air-conditioning system as claimed in claim 8, wherein said pollen mode control means corrects said target outlet air temperature based on a set temperature set by a vehicle occupant.

11. An automotive air-conditioning system as claimed in claim 8, wherein said air-conditioning unit includes an air mix door control means (15*a*) which constitutes said outlet air temperature control means, and said air mix door control means determines an air mix door opening based on said target outlet air temperature corrected by said pollen mode control means.

12. An automotive air-conditioning system as claimed in claim 1, wherein in said pollen mode control, said pollen mode control means determines a set value for said amount of air based on said outside temperature detected by said ambient temperature sensor.

13. An automotive air-conditioning system as claimed in claim 1, wherein said pollen mode setting means has a pollen mode switch and, when said pollen mode switch is operated, it is determined that said pollen mode control is effected, or wherein said pollen mode setting means has a pollen sensor and, when the amount of pollen detected by said pollen sensor exceeds a predetermined value, it is determined that said pollen mode control is effected.

* * * * *

UNITED STATES PATENT AND TRADEMARK OFFICE
CERTIFICATE OF CORRECTION

PATENT NO. : 7,647,786 B2  Page 1 of 1
APPLICATION NO. : 11/242282
DATED : January 19, 2010
INVENTOR(S) : Yamaguchi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 882 days.

Signed and Sealed this

Sixteenth Day of November, 2010

David J. Kappos
*Director of the United States Patent and Trademark Office*